United States Patent [19]

Federspiel

[11] Patent Number: 5,768,121
[45] Date of Patent: Jun. 16, 1998

[54] ADAPTIVE FLOW CONTROLLER FOR USE WITH A FLOW CONTROL SYSTEM

[75] Inventor: Clifford C. Federspiel, Shorewood, Wis.

[73] Assignee: Johnson Service Company, Milwaukee, Wis.

[21] Appl. No.: 448,681

[22] Filed: May 24, 1995

[51] Int. Cl.$^6$ .................................................. G05B 13/02
[52] U.S. Cl. ...................... 364/148; 364/157; 364/162; 364/166
[58] Field of Search ...................... 236/46 R, 49.3, 236/49.5, 91 C; 165/16; 73/3; 454/61, 370, 49; 364/177, 148–152, 153, 157, 160–166, 176

[56] References Cited

U.S. PATENT DOCUMENTS

| | | | |
|---|---|---|---|
| 5,268,834 | 12/1993 | Sanner et al. | 364/151 |
| 5,395,042 | 3/1995 | Riley et al. | 236/46 R |
| 5,446,677 | 8/1995 | Jensen et al. | 364/510 |
| 5,479,812 | 1/1996 | Juntunen et al. | 73/3 |

*Primary Examiner*—Reba I. Elmore
*Assistant Examiner*—Thomas E. Brown
*Attorney, Agent, or Firm*—Harness, Dickey & Pierce, P.L.C.

[57] ABSTRACT

The present invention relates to an adaptive airflow control system for positioning damper systems or controlling air units utilized in an environment control system. The system is based on a conservative, fixed-gain, proportional-only feedback design to guarantee stable operation given the nonlinear behavior of flow through a valve or damper. A time-dependent deadzone of nonlinearity is used to reject measurement noise. Such a system allows a person to adjust the performance of the system by selecting a parameter that affects the tradeoff between tracking capability and noise rejection.

20 Claims, 7 Drawing Sheets

```
function [f,z,tau,theta,R]=Pflowcntrl (theta0,fd,ps)
%
%      function [f,z,u,theta]=Pflowcntrl (theta0,fd,ps)
%
% THE NEXT FOUR LINES ARE FOR DISPLAYING THE RESULTS
clg
axis ([0 length (fd) -1 0 1.1])
plot (0:length(fd) -1,fd,'--',0:length (ps) -1,ps/248.8)
hold
rand ('normal') % SELECT NORMALLY DISTRIBUTED NOISE
theta (1)=theta0; % INITIALIZE POSITION FOR SIMULATION
Area=0.143; % X-SECTIONAL AREA OF UPSTREAM DUCT
amax=0.0715; % THROAT AREA OF BOX
amin=0; %0.0013; % CLOSED AREA OF BOX (TO SIMULATE LEAKAGE)
c=1.94; % BOX CALIBRATION CONSTANT, ND
muLdD=7.18; % FRICTIONAL LOSS FACTOR, ND
rho=1.25; % DENSITY OF AIR, KG/CUBIC METER
Rnom=5.5696e-6; %5.5696e-4; % VARIANCE OF MEASUREMENT NOISE, (M^3 /SECOND)^2
tau (1)=0; % INITIAL PULSE WIDTH, SECONDS
area=(amax-amin) * (1-cos(theta0) ) +amin; % COMPUTE INITIAL BOX AREA
tc=1; % SENSOR TIME CONSTANT, SECONDS
% NEXT LINE COMPUTES INITIAL FLOW RATE
f (1)=c*area.*sqrt (2*ps (1) ./ (rho* (1+area.*area/ (Area^2) * ( (c^) * muLdD - 1))));
ff (1)=f (1) ; % INITIALIZE SENSOR DYNAMICS, (M^3 /SECOND) ^2
e (1)=fd (1) -f (1) +sqrt (Rnom) *rand; % COMPUTE INITIAL ERROR, (M^3 /SECOND) ^2
%*******************************************************
% THE FOLLOWING 9 LINES INITIALIZE THE CONTROLLER
%*******************************************************
R (1)=Rnom; % INITIALIZE NOISE ESTIMATOR, (M^3 /SECOND) ^2
taumin=1/6000; %0.2; % MINIMUM PULSE WIDTH, SECONDS
taumax=1; % MAXIMUM PULSE WIDTH, SECONDS
T=1; %60; % ACTUATOR STROKE TIME, SECONDS
frated=1.01; % MAXIMUM FLOW AT ONE INCH STATIC PRESSURE, M^3 /SECOND
gmax=5*sqrt (3) *frated/T; % MAXIMUM SYSTEM GAIN
ts=1; % SAMPLING PERIOD, SECONDS
wf=ts/T; % NOISE ESTIMATOR GAIN, ND
zeta=0.5; % WORST-CASE DECAY RATE, ND
p=.01; %.002; % PROBABILITY OF ISSUING A PULSE WHEN THE ERROR IS ZERO
z=sqrt (2) *inverf (1-p) % p/2 PERCENTAGE POINT OF THE STANDARD NORMAL DISTRIBUTION
et= (1-zeta/2) *taumin*gmax % THRESHOLD ERROR FOR PWM LOGIC
```

Fig-7A

```
%***************************************************
for i=2 : length (fd) ,
  tehta (i)=theta (i-1)+tau (i-1) *pi/2/T; % COMPUTE ANGLE
  area= (amax-amin) * (1-cos (theta (i) ) ) +amin; % COMPUTE AREA
% NEXT LINE COMPUTES FLOW
  f (i) =c*area*sqrt (2*ps (i) / (rho* (1+area*area/ (Area^2) * ( (c^2) *muLdD - 1) ) ) )
  plot ( [i-1:i] , [f (i-1) f (i) ] ) % DISPLAY INCREMENTAL RESULTS
  ff (i) =exp (-ts/tc) *ff (i-1)+(1-exp (-ts/tc) ) *f (i-1) ; % COMPUTE SENSOR SIGNAL
  z (i) =ff (i) +sqrt (Rnom) *f (i) / (frated/2) *rand; % COMPUTE MEASUREMENT
%***************************************************
% THE NEXT 22 LINES ARE THE CONTROLLER
%***************************************************
  if (i>3) , % WAIT UNTIL BUFFER IS FULL, THEN ESTIMATE NOISE VARIANCE
    R (i) =max ( [ (1-wf) *R (i-1) +wf* (1/6* (z(i-2) -2*z (i-1) +z (i) ) ^2) ; 1e-7] ) ;
  else
    R (i) =R (i-1) ;
  end
  Delta=max ( [Z*sqrt (R (i) ) -et; 0 ] ) ; % COMPUTE DEAD ZONE
  e (i) =fd (i) -z (i) ; % COMPUTE ERROR
  if abs (e(i) ) <Delta, % MODIFY ERROR BY DEAD ZONE
    e (i) =0 ;
  else
    e (i) =e (i) -sign (e (i) ) *Delta;
  end
  tau (i) =e (i) /gmax; % COMPUTE PULSE WIDTH
  if abs ( tau (i) ) >taumax, % MODIFY PULSE WIDTH FOR MAX AND MIN PULSE
    tau (i) =sign (tau (i) ) *taumax;
  elseif abs (tau (i) ) <taumin,
    if abs (tau (i) ) > (1-zeta/2) *taumin,
      tau (i) =sign (tau (i) ) *taumin;
    else,
      tau (i) =0;
    end
  end
%***************************************************
end
hold
``` modified e

ADAPTIVE FLOW CONTROLLER FOR USE WITH A FLOW CONTROL SYSTEM

NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

FIELD OF THE INVENTION

The present invention is related to an airflow control apparatus or an environmental control system. More particularly, the present invention is related to an adaptive control system for positioning damper systems or controlling air units utilized in an environment control system.

Environment control networks, facility management systems, and damper systems are employed in office buildings, manufacturing facilities, and appliances for controlling the internal environment of the facility. For example, in a heating, ventilating, and air conditioning (HVAC) system, controlled air units (e.g., variable air volume (VAV) boxes, unitary devices (UNT) or damper systems) are located throughout the facility and provide environmentally controlled air to the internal environment of the facility. The controlled air is provided at a particular temperature or humidity so that a comfortable internal environment is established. The air flow rate of the controlled air is preferably measured in cubic feet per minute (CFM).

The VAV boxes are coupled to an air source which supplies the controlled air to the VAV box via duct work. VAV boxes and unitary devices provide the controlled air through a damper. The damper regulates the amount of the controlled air provided to the internal environment. The damper is coupled to an actuator which preferably positions the damper so that appropriate air flow (in CFM) is provided to the internal environment.

A controller is generally associated with at least one actuator and damper. The controller receives information related to the air flow and temperature in the internal environment and appropriately positions the actuator so that the appropriate air flow is provided to the internal environment. The controller may include sophisticated feedback mechanisms such as proportional integral (PI) control algorithms. Sophisticated feedback mechanisms allow the actuator to be positioned more precisely.

More particularly, the controller generally includes a flow control system for positioning the actuator so that the damper provides a desired amount of air flow. The flow control system typically measures the actual air flow across the damper and adjusts the position of the actuator until the desired amount of air flow is provided by the controlled air unit. In such systems, the performance of the flow control system (e.g., the accuracy or precision of the position of the system damper) is critical to reliability, energy efficiency, and overall performance of the HVAC system and controlled air unit. Poor flow control often leads to degraded temperature control performance, decreased efficiency for the controlled air unit, and premature mechanical failures for the actuator and damper system associated with the unit.

Heretofore, flow controllers or flow control systems in HVAC systems are prone to slow response and poor disturbance rejection due to the inherent non-linear behavior and measurement noise associated with controlled air units such as VAV boxes. The measurement of actual air flow is strongly affected by turbulence. Additionally, friction, hysteresis, and non-linear relationships between the flow rate and damper position complicate the control of damper systems. A traditional approach to solving these problems involves the use of proportional, (P), proportional-integral (PI), or proportional-integral-derivative (PID) positioning algorithms for the damper.

Thus, there is a need for a flow controller which is less prone to sluggishness and oscillatory behavior. There is also a need for a flow controller which can be set to have a low duty cycle and yet provide acceptable setpoint tracking.

SUMMARY OF THE INVENTION

The present invention relates to an environment control system which includes an air unit which provides air flow to an environment. The air unit is operatively associated with a controller and controls an amount of the air flow in accordance with a flow setpoint signal. The controller includes a flow sensor, a memory and a processor. The flow sensor is exposed to the air flow provided by the unit and generates a flow signal representative of an amount of the air flow provided to the environment. The processor is coupled to the memory and the sensor and configured to cyclically receive the flow signal and generate a controller output signal in response to the flow signal and the flow setpoint signal. The controller output is provided to the air unit to move the damper to a position corresponding to the flow setpoint signal. The processor calculates the controller output signal in accordance with a setpoint error signal and a deadzone of nonlinearity. The deadzone of nonlinearity is calculated in accordance with a variance of the flow signal.

The present invention also relates to a controller for use in an environment control system which includes an air duct including a damper which is operatively associated with an actuator. The actuator positions the damper so that the damper provides a rate of air flow to an environment in response to an actuator control signal. The actuator control signal represents the air flow rate and is operatively coupled to the controller. The controller includes a sensor means, a memory means and a processor means. The sensor means generates an actual flow signal. The memory means stores information. The processor means is coupled to the memory means and the sensor means, and cyclically receives the actual flow signal from the sensor means and cyclically generates the actuator control signal in response to the actual flow signal. The actuator is related to a desired rate for the rate of the air flow provided across the damper. The processor means calculates the actuator control signal in accordance with a setpoint error signal and a deadzone of nonlinearity. The deadzone of nonlinearity is calculated in accordance with a variance of the actual flow signal.

The present invention also relates to a control system which includes a unit such as a damper or valve for providing flow, a controller for providing a controller output signal, and a flow sensor for providing an actual flow signal. The unit is operatively associated with a controller and controls an amount of the flow in accordance with the controller output signal. The flow sensor is exposed to the flow provided by the unit and generates the actual flow signal representative of the amount of air flow. A method of controlling the amount of the flow provided by the unit comprises the steps of receiving the actual flow signal from the flow sensor, determining a setpoint error signal based on a flow setpoint signal and the actual flow signal, calculating a deadzone of nonlinearity in accordance with a variance of the actual flow signal, applying the deadzone of nonlinearity to the setpoint error signal to develop the controller output signal, and providing the controller output signal to the unit.

Certain aspects of the present invention adaptively provide a time-dependent deadzone of nonlinearity to reject measurement noise. The user can adjust the performance of the system by selecting a parameter which affects the tradeoff between tracking capability and noise rejection. The deadzone of nonlinearity operates to dampen small adjustments to the actuator control signal, thereby reducing the actuator duty cycle.

The flow controller of the present invention advantageously requires few computations and does not require tuning. In another aspect of the invention, the flow controller is coupled to a memory which receives the deadzone of nonlinearity and recalculates the deadzone of nonlinearity data after each cycle. The flow controller is implemented in a software program.

BRIEF DESCRIPTION OF THE DRAWINGS

The invention will hereafter be described with reference to the accompanying drawings, wherein like numerals denote like elements, and:

FIGS. 7A–B show pseudo code in accordance with an exemplary aspect of the present invention.

DETAILED DESCRIPTION OF THE PREFERRED EXEMPLARY EMBODIMENT OF THE PRESENT INVENTION

Figure 1:
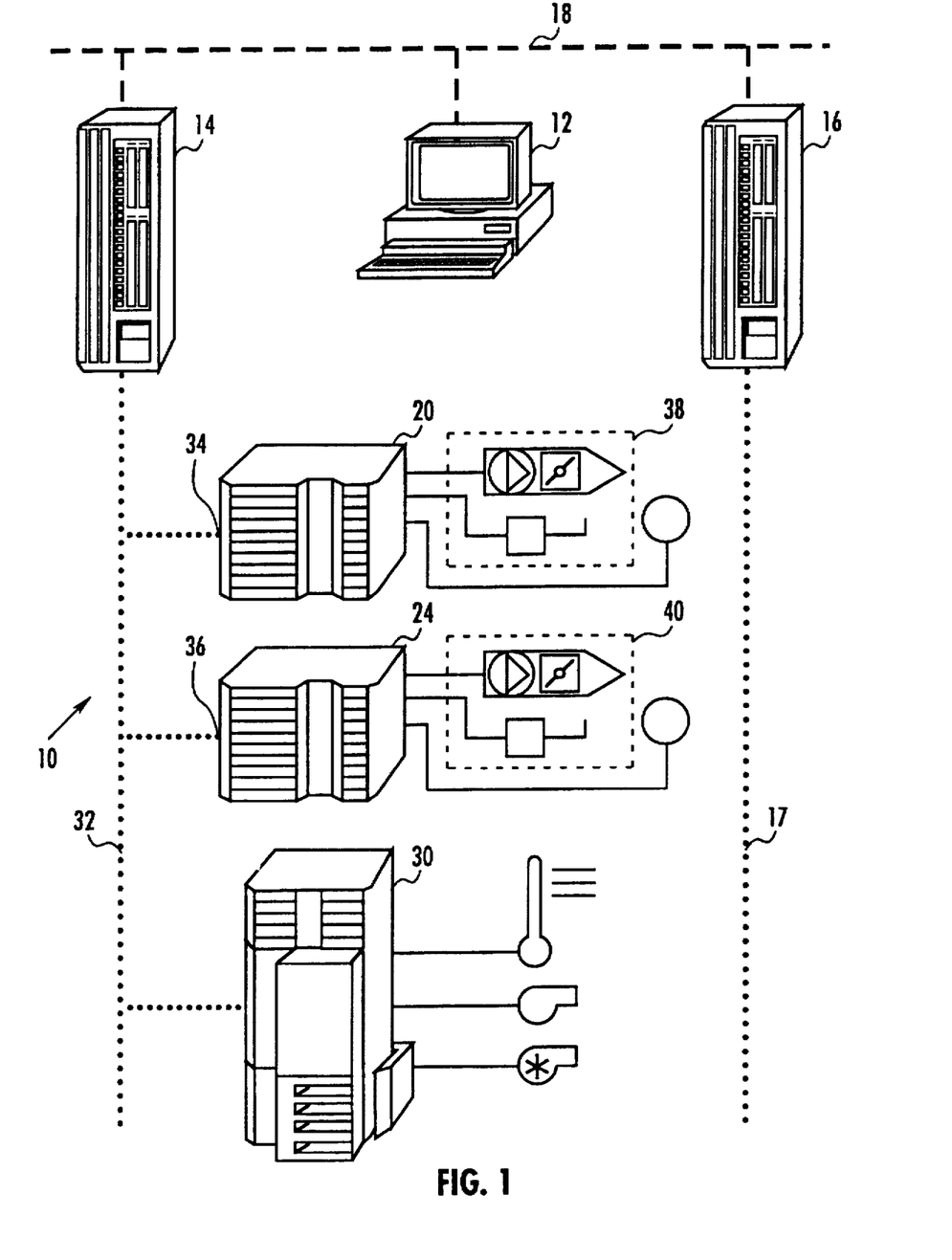
FIG. 1 is a simplified schematic block diagram of an environment control system.

Referring to FIG. 1, the present invention may be utilized in an environment control network or system 10. Although the present invention is described below for use in an HVAC environment, the flow controller of the present invention may be utilized in any fluid flow application. For example, the flow controller of the present invention may be used in liquid supply systems such as those used in petroleum or chemical processing industries or other flow applications such as those in food preparation, material treatment plants or any industry utilizing controlled flow of material.

Environment control system 10 including a work station 12, a station 14, a station 16, a controller 20, a controller 24, and a controller or module 30. Controllers 20, 24 and module 30 are coupled with station 14 via a communication bus 32. Work station 12, station 14 and station 16 are coupled together via a communication bus 18. Station 16 is also coupled to a communication bus 17. Communication bus 17 may be coupled to additional sections or additional controllers, as well as other components utilized in environment control system 10.

Preferably, environment control system 10 is a facilities management system such as the Metasys™ system as manufactured by Johnson Controls, Inc. (JCI) for use with VAV boxes 38 and 40. Alternatively, system 10 can be a unitary system having roof-top units or other damper systems. Stations 14 and 16 are preferably an NCU station manufactured by JCI, and controllers 20 and 24 are VAV 100–0™ controllers manufactured by JCI or other controllers known in the art. Controller or module 30 is preferably an air handler control unit (AHU) such as a AHU 102–0™ unit manufactured by JCI for monitoring and effecting the operation of an air handler (not shown) which provides forced air for system 10.

Communication buses 17 and 32 are N2 buses preferably comprised of a twisted pair of conductors, and communication bus 18 is a LAN (N1) bus for high level communications. Bus 18 is a high speed bus using ARCNET™ or ethernet protocol. Work station 12 and stations 14 and 16 include ethernet or ARCNET communication hardware. Buses 17 and 32 utilize RS485 protocol. Controllers 20 and 24, module 30, and stations 14 and 16 include RS485 communication hardware. Preferably, controllers 20 and 24, stations 14 and 16, and work station 12 include communication software for transmitting and receiving data and messages on buses 17, 18 and 32.

Controller 20 is operatively associated with a controlled air unit such as VAV box 38, and controller 24 is operatively associated with a controlled air unit such as VAV box 40. Controller 20 communicates with work station 12 via communication bus 32 through station 14 and communication bus 18. Preferably, station 14 multiplexes data over communication bus 32 to communication bus 18. Station 14 operates to receive data on communication bus 32, provide data to communication bus 18, receive data on communication bus 18, and provide data to communication bus 32. Station 14 preferably is capable of other functions useful in environment control system 10. Work station 12 is preferably a PC/AT computer or may be a portable computer which is coupled to communication bus 18.

Figure 2:
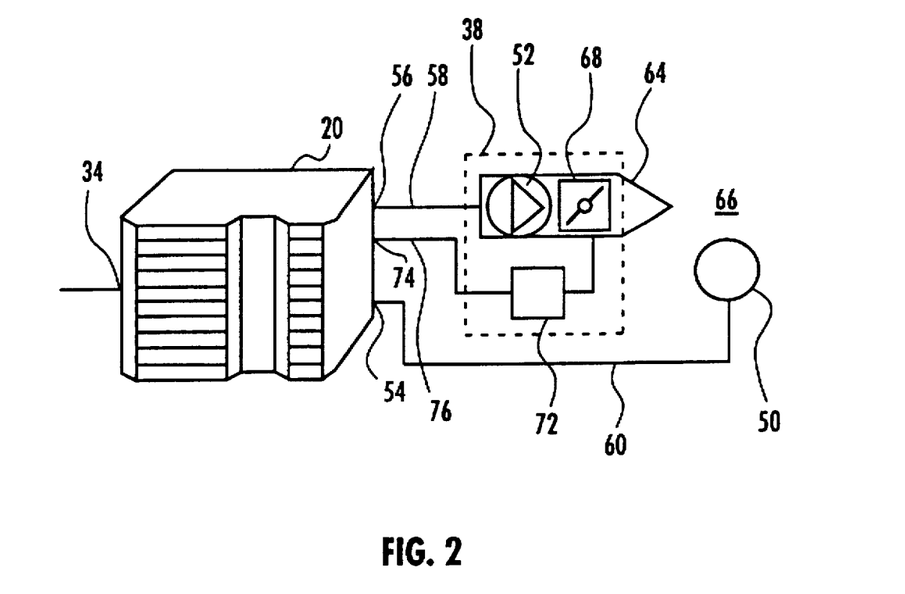
FIG. 2 is a more detailed schematic block diagram of a controller and a VAV box for use in the environment control system illustrated in FIG. 1.

The following is a more detailed description of controller 20 and VAV box 38 with reference to FIG. 2. Controller 20 is preferably a direct digital control (DDC) which includes a communication port 34 coupled with communication bus 32 (FIG. 1). Controller 20 preferably includes an air flow input 56, a temperature input 54, and an actuator output 74. VAV box 38 may also advantageously include heating or cooling units for treating an air flow 64. Inputs 54 and 56 are preferably analog inputs received by an A/D converter (not shown) in controller 20. Controller 20 preferably includes circuitry and software for conditioning and interpreting the signals on inputs 54 and 56.

VAV control box 38 preferably includes a damper 68, an air flow sensor 52, and an actuator 72. Actuator 72 positions damper 68 and is preferably an electric motor based actuator. Many controllers use synchronous AC motors with dual winding as actuator 72. Alternatively, actuator 72 and controller 20 may be pneumatic or any other type of device for controlling and positioning damper 68. Actuator 72 is preferably an EDA-2040™ motor manufactured by JCI having a full stroke time ($T_{stroke}$) of 1, 2, or 5.5 minutes for a 90° stroke.

The position of damper 68 controls the amount of air flow 64 provided to environment 66. Environment 66 is preferably a room, hallway, building, or portion thereof or other internal environment. Air flow sensor 52 preferably provides an air flow parameter across conductor 58 to air flow input 56. The airflow parameter represents the amount of air flow 64 provided through damper 68 to an environment 66.

Controller 20 provides an actuator output signal to actuator 72 from actuator output 74 via a conductor 76. Controller 20 receives a temperature signal from a temperature sensor 50 across a conductor 60 at temperature input 54. Temperature sensor 50 is generally a resistive sensor located in environment 66.

Air flow sensor 52 is preferably a differential pressure (ΔP) sensor which provides a ΔP factor related to airflow (volume/unit time, hereinafter CFM airflow). CFM airflow may be calculated by the following equation:

$$CMF \text{ Air Flow} = 4005 \left( \sqrt{\frac{\Delta P}{K}} \right) \times \text{Box Area} \quad (1)$$

where: ΔP is the differential pressure from air flow sensor 52;

Box Area is the inlet supply cross-section area in square feet; and

K is a CFM multiplier representing the pickup gain of the air flow.

The value K and value of box area are stored in a memory (not shown) in controller 20 when controller 20 is initialized or coupled with VAV box 38. The value of box area is generally in the range of 0.08 to 3.142 feet squared, and the value of K is generally between 0.58 and 13.08. The value of box area and K may be advantageously communicated from controller 20 to work station 12 so that service people do not have to otherwise obtain these values from paper data sheets and files. Air flow sensor 56 is preferably a diaphragm-based pressure sensor.

With reference to FIGS. 1 and 2, the operation of environment control system 10 is described as follows. Controllers 20 and 24 are configured to appropriately position actuator 72 in accordance with a cyclically executed control algorithm. In accordance with the algorithm, controller 20 receives the air flow signal at input 56, the temperature signal at input 54, and other data (if any) from bus 32 at port 34 every cycle, preferably every 1.5 seconds or, alternatively, 1.0 seconds, depending on the controller algorithm. Controller 20 provides the actuator output signal at the actuator output 74 every cycle to accurately position damper 68 so that environment 66 is appropriately controlled (heated, cooled, or otherwise conditioned). Thus, controller 20 cyclically responds to the air flow signal and the temperature signal and cyclically provides the actuator output signal to appropriately control internal environment 66.

Preferably, the actuator output signals are pulse width signals which cause actuator 72 to move forward, backward, or stay in the same position, and controller 20 internally keeps track of the position of actuator 72 as it is moved. Alternatively, actuator 72 may provide feedback indicative of its position, or the actuator signal may indicate the particular position to which actuator 72 should be moved.

Figure 3:
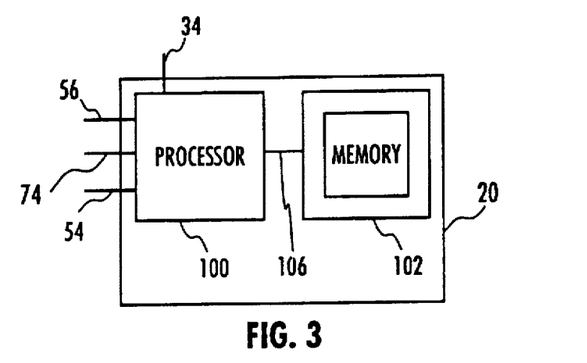
FIG. 3 is a more detailed schematic block diagram of the controller illustrated in FIG. 2.

FIG. 3 is a more detailed block diagram of controller 20 in accordance with an exemplary aspect of the present invention. Controller 20 includes a processor 100 coupled with actuator output 74, temperature input 54, air flow input 56, and communication port 34. Processor 100 is preferably an 80C652 processor and communication port 34 is coupled with a twisted pair of conductors comprising communication bus 32 (FIG. 1).

Controller 20 also includes a memory 102. Memory 102 may be any storage device including but not limited to a disc drive (hard or floppy), a RAM, EPROM, EEPROM, flash memory, static RAM, or any other device for storing information. Preferably, memory 102 includes RAM and an EEPROM for storing air flow control algorithm data. Memory 102 is coupled to the processor via an internal bus 106.

In operation, processor 100 cyclically samples signals at temperature input 56, actuator output 74, and air flow input 56 and performs mathematical operations on these signals. The mathematical operations generate parameter values representative of the signals at inputs 54 and 56 and output 74.

Figure 4:
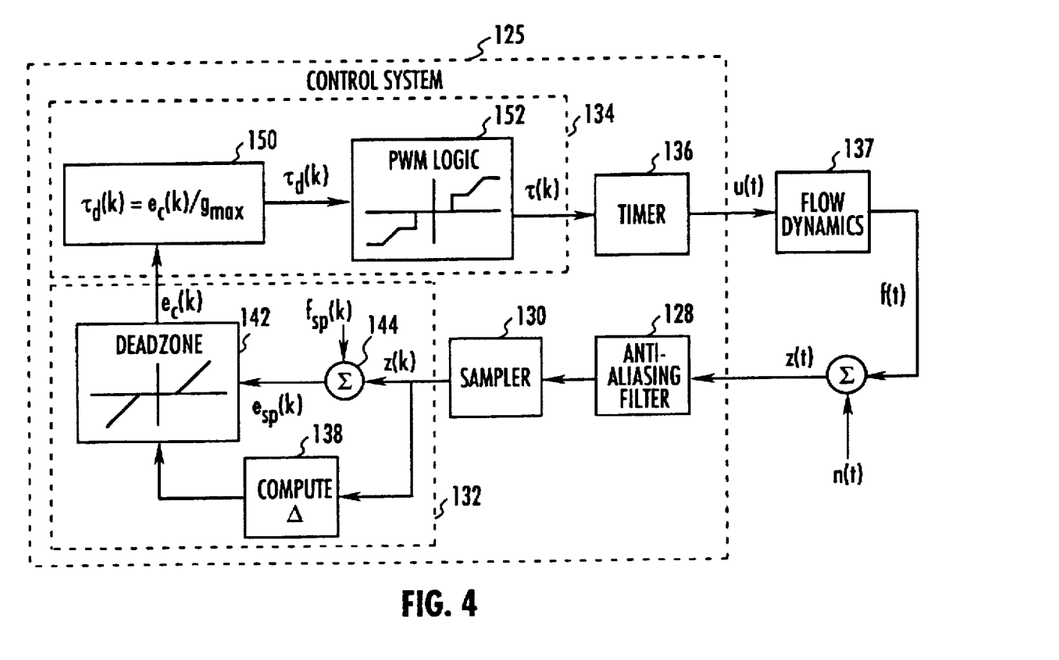
FIG. 4 is a block diagram illustrating the software-based control algorithm for the controller shown in FIG. 3.

With reference to FIG. 4, the operation of system 10 in a dynamic environment 137 is represented in a flow control diagram. Controller 20 is programmed to operate as a flow controller circuit 125 which generates an actuator output signal u(t) to position damper 68 (FIG. 2). Circuit 125 includes an anti-aliasing filter 128, a sampler 130, a controller error circuit 132, a controller output circuit 134 and a timer 136.

Air flow sensor 52 (FIG. 2) generates a continuous time measurement signal z(t). A flow signal f(t) is representative of the amount of air flow to environment 137, and is typically corrupted by noise which is represented by n(t). The combination of the measurement noise signal n(t) and the flow signal f(t) is represented by the continuous time measurement signal z(t) provided by sensor 52.

An analog low-pass anti-aliasing filter 128 receives and filters the continuous time measurement signal z(t) so noise at frequencies higher than the Nyquist frequency of sampler 130 is rejected. Sampler 130 receives the filtered continuous time measurement signal z(t) and provides the filtered signal z(t) to controller error circuit 132 as a discrete air flow signal z(k) which represents the measured air flow signal from flow sensor 52 at the kth instant in time. Controller error circuit 132 receives the discrete air flow signal z(k) from sampler 130 and computes a controller error signal $e_c(k)$ based on a previously-stored flow setpoint signal $f_{sp}(k)$, the discrete air flow signal z(k) and a deadzone of linearity.

Controller output circuit 134 receives the controller error signal $e_c(k)$ from controller error circuit 132 and computes a pulse signal $\tau_d(k)$ to timer 136 based on a desired pulse width τ(k), a minimum pulse width $\tau_{min}$, a maximum pulse width $\tau_{max}$, a decay rate ζ, a system gain $g_{max}$ and the controller error signal $e_c(k)$. The pulse width signal τ(k) represents the change in position of actuator 72 should be positioned. Timer 136 receives the pulse width signal τ(k) and issues the actuator output signal u(t) to actuator 72 (FIG. 2). Actuator 72 receives the actuator output signal u(t) from actuator output 74 via conductor 76 and adjusts the position of damper 68 so that environment 66 is appropriately controlled.

The operation of flow controller circuit 125 is discussed in more detail as follows. Sampler 130 converts the continuous time measurement signal z(t) to a discrete air flow signal z(k).

Controller error circuit 132 receives the discrete air flow signal z(k) and computes the controller error signal $e_c(k)$. Controller error circuit 132 includes a deadzone circuit 138, a controller error signal circuit 142, and a summer 144. Summer 144 calculates a setpoint tracking error signal $e_{sp}(k)$ based on the difference between the discrete air flow signal z(k) and the flow setpoint signal $f_{sp}(k)$. The flow setpoint signal $f_{sp}(k)$ is related to the position to which actuator 72 should have been moved (the desired air flow rate) in the previous cycle and may be user input or calculated by the controller algorithm or other hardware or software components in system 10. The flow setpoint signal $f_{sp}(k)$ is calculated in response to temperature, air flow or other system parameters. More specifically, the setpoint tracking error signal $e_{sp}(k)$ is calculated as follows:

$$e_{sp}(k) = f_{sp}(k) - z(k) \quad (2)$$

Deadzone circuit 138 also receives the discrete air flow signal z(k) and computes the deadzone of nonlinearity.

The deadzone of nonlinearity is dependent on the amount, variance and standard deviation of noise in the discrete air flow signal z(k). It is adaptively calculated and adaptively related to the setpoint tracking error signal $e_{sp}(k)$ insofar memory 102 stores the deadzone of nonlinearity which was calculated in the previous cycle of flow controller circuit 125. The deadzone of nonlinearity depends on the chosen system feedback gain $g_{max}$ and the chosen decay rate $\zeta$ for circuit 134.

Controller error signal circuit 142 receives the setpoint tracking error signal $e_{sp}(k)$ from summer 144, the deadzone of nonlinearity from deadzone circuit 138, and calculates the controller error signal $e_c(k)$ by applying the deadzone of nonlinearity to the setpoint tracking error signal $e_{sp}(k)$ to reject measurement noise. Therefore, the controller error signal $e_c(k)$ is not necessarily the setpoint error. It is the value calculated by controller error signal circuit 142 after the setpoint tracking error signal $e_{sp}(k)$ has been processed to eliminate noise. Thus, the user can adjust the performance of flow controller circuit 125 by selecting a parameter that affects the tradeoff between tracking capability and noise rejection.

Controller output circuit 134 receives the controller error signal $e_c(k)$ from controller error signal circuit 142 and generates the new pulse width signal τ(k) representative of the desired air flow or desired position of actuator 72. Controller output circuit 134 includes a desired pulse width circuit 150 and a pulse width modulation logic circuit 152. Pulse width circuit 150 receives the controller error signal $e_c(k)$ and initially calculates the desired pulse width $\tau_d(k)$ based on the following equation:

$$\tau_d(k) = \frac{e_c(k)}{g_{max}} \quad (3)$$

wherein $g_{max}$ represents the maximum system gain.

The discrete-time integrator is only stable if the system feedback gain is greater than zero and less than approximately two times the inverse of the gain of flow controller circuit 125. Therefore, a preferable stability range for Equation 5 is calculated as follows:

$$0 < K < \frac{2}{g_{max}} \quad (4)$$

where K is the proportional gain of controller 20. In order to guarantee flow controller circuit 125 is stable under all operating conditions, the system feedback gain $g_{max}$ used in Equation 6 is derived from the worst-case (maximum) gain of the time-varying integrator. Preferably, the following estimate of the worst-case system gain $g_{max}$ is used in Equation 5:

$$g_{max} = 5\sqrt{3} \; \frac{f_{rated}}{T} \quad (5)$$

The factor of 5 accounts for the effects of the position of actuator 72 and the pressure ratio on the gain. The term $f_{rated}$ is the flow rate at a nominal static pressure (e.g., one inch of water) when damper 68 is completely open. The factor of $\sqrt{3}$ accounts for the fact that the static pressure encountered in practice may be larger than the nominal static pressure by a factor of 3. The term T denotes the stroke time of actuator 72. Typically, $g_{max}$ is within a range from 5.77 to 1371 CFM/sec.

Pulse width modulation circuit 134 receives the desired pulse width signal $\tau_d(k)$ and issues the pulse signal τ(k) to timer 136 based on the following relationship:

$$\tau(k) = \begin{cases} \text{sign}(\tau_d(k))\tau_{max} & \text{when } |\tau_d(k)| > \tau_{max} \\ \tau_d(k) & \text{when } \tau_{min} < |\tau_d(k)| \leq \tau_{max} \\ \tau_{min} & \text{when } \left(1 - \frac{\zeta}{2}\right)\tau_{min} < |\tau_d(k)| \leq \tau_{min} \\ 0 & \text{when } |\tau_d(k)| \leq \left(1 - \frac{\zeta}{2}\right)\tau_{min} \end{cases} \quad (6)$$

where $\tau_{min}$ is the minimum pulse width, $\tau_{max}$ is the maximum pulse width and $\zeta$ is the decay rate under worst case conditions.

Figure 5:
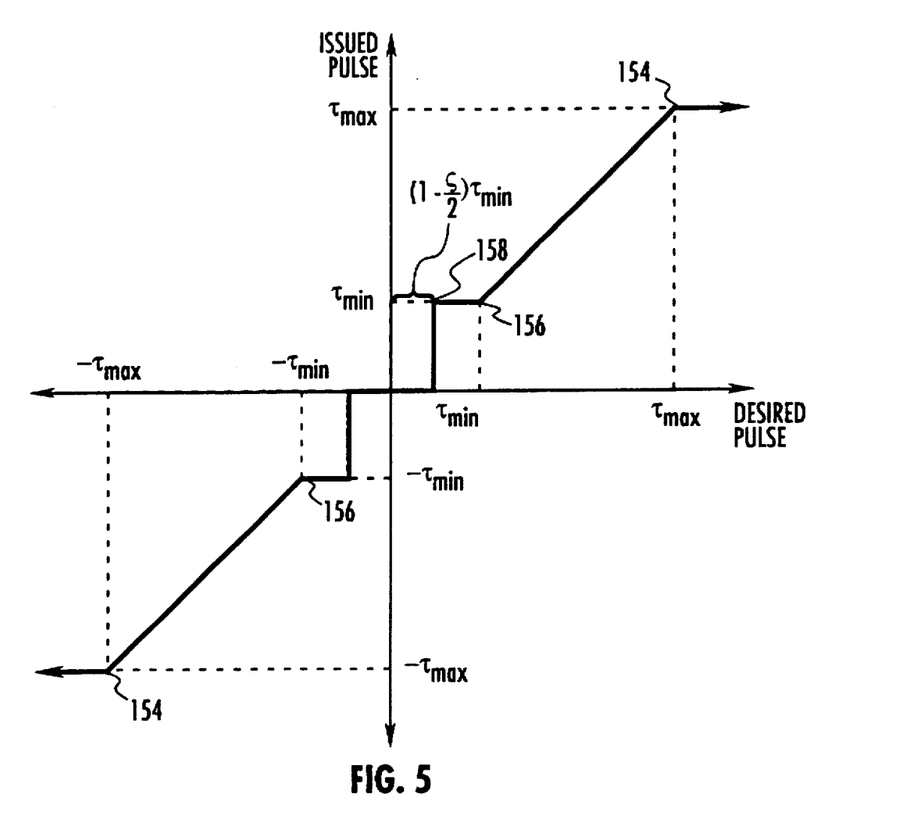
FIG. 5 is a diagram illustrating the calculation of the pulse width signal based on the pulse width modulation function for the controller shown in FIG. 3.

Therefore, pulse width modulation circuit 134 provides timer 136 with the maximum pulse width $\tau_{max}$ when the controller error signal $e_c(k)$ is large, the minimum pulse width $\tau_{min}$ when the controller error signal $e_c(k)$ is small, 0 when the controller error signal $e_c(k)$ is very small and the desired pulse width $\tau_d(k)$ when the desired pulse width $\tau_d(k)$ is greater than the minimum pulse width $\tau_{min}$ and less than or equal to the maximum pulse width $\tau_{max}$. Referring to FIG. 5 and Equation 8, the pulse width signal τ(k) drives actuator 72 for the maximum amount of time when the controller error signal $e_c(k)$ is very large as represented by a $\tau_{max}$ point 154. When the controller error signal $e_c(k)$ is small (i.e., $\tau_{min} < |\tau_d(k)| \leq \tau_{max}$), actuator 72 is driven the desired amount of time (i.e. $\tau(k) = \tau_d(k)$) as represented by the linear portion of the graph between $\tau_{max}$ point 154 and a $\tau_{min}$ point 156. Actuator 72 is driven for a minimum amount of time when the controller error signal $e_c(k)$ is smaller as represented by $\tau_{min}$ point 156.

As previously described in conjunction with controller error circuit 132, a pulse-width modulated device with high-gain feedback, such as constant-rate actuator 72, is susceptible to measurement noise which results in an increase in the average duty cycle of actuator 72. Therefore, controller 20 needs some ability to reject measurement noise.

During every cycle of operation of flow controller circuit 125, the deadzone of nonlinearity is applied to the setpoint tracking error signal $e_{sp}(k)$ to reject measurement noise and results in the controller error signal $e_c(k)$. The deadzone of nonlinearity depends on the magnitude of the measurement noise and the acceptable probability controller 20 will issue a pulse width switching signal u(t) that moves the flow signal f(t) away from the flow setpoint signal $f_{sp}(k)$ when the flow signal f(t) is exactly equal to the flow setpoint signal $f_{sp}(k)$. This probability is represented by p. The deadzone of nonlinearity also depends on the system feedback gain $g_{max}$ and the decay rate $\zeta$ in Equations 5 and 8.

Figure 6:
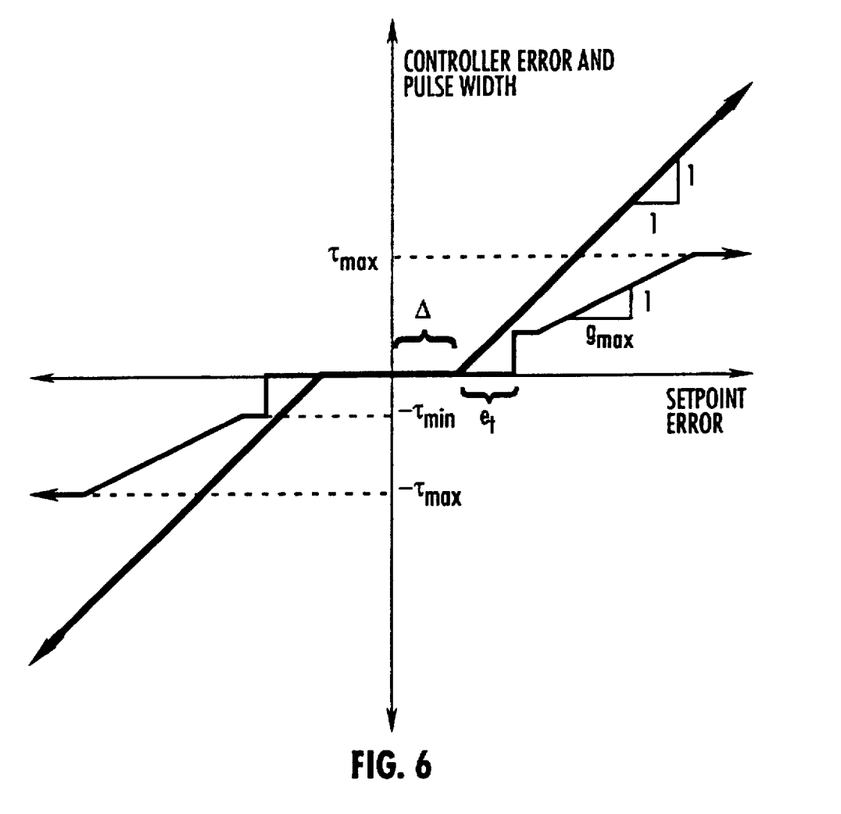
FIG. 6 is a diagram illustrating the calculation of the controller error signal based on the setpoint error signal and the deadzone of nonlinearity for the controller shown in FIG. 3.

Referring to FIG. 6, the pulse signal τ(k) and the deadzone of nonlinearity have a direct effect on the setpoint tracking error signal $e_{sp}(k)$. The minimum setpoint tracking error signal $e_{sp}(k)$ causes a pulse to be issued by controller output circuit 134 and is dependent on the deadzone of nonlinearity, the system gain $g_{max}$, and the decay rate $\zeta$. Assuming the measurement noise is normally distributed and there is an acceptable value of p, deadzone circuit 138 preferably calculates the deadzone of nonlinearity as follows:

$$\Delta = \max \left[ Z_{\frac{p}{2}} \sqrt{R(k)} - e_t, 0 \right] \quad (9)$$

wherein:

$$e_t = g_{max} \tau_{min} \left( 1 - \frac{\zeta}{2} \right) \quad (10)$$

where Zp/2 is the upper P/2 percentage point of the standard normal distribution. R(k) is the variance of the measurement noise. and $e_t$ is the minimum magnitude of the controller error such that a pulse is issued. The parameter p is preferably any number between 0 and 1 and can be specified by the user to achieve a tradeoff between setpoint tracking and duty cycle. For most applications involving cascaded flow and zone temperature control, p is small (for example, preferably 0.01). However, there are some applications, such as zone balancing, in which the user may make p large (e.g., 0.2–0.3) so that a rapid response with a minimal steady-state error is achieved.

Generally, the variance of the measurement noise changes with time so it is estimated as controller 20 operates. The following equation estimates the variance of the measurement noise:

$$R(k) = (1-w) R(k-1) + w \frac{1}{6} (z(k-2) - 2z(k-1) + z(k))^2 \quad (12)$$

wherein w represents the filter factor which is calculated as follows:

$$w = \frac{t_s}{T} \quad (13)$$

where T is the stroke time of actuator 72 and $t_s$ is the sampling interval. Timer 136 receives the pulse signal τ(k) from pulse width modulation logic circuit 152 and issues the actuator output signal u(t) to actuator 72 from actuator output 74 via conductor 76 which adjusts the position of damper 68 so that environment 66 is appropriately controlled. A pulse width switching signal of 1, 0 or −1 represents positive movement, no movement or negative movement, respectively, of actuator 72, and is issued by timer 136 during each cycle of operation of flow controller circuit 125. As illustrated in FIG. 4, this cyclical operation of the software-based control algorithm used in flow controller circuit 125 then begins again by air flow sensor 52 generating the continuous time measurement signal z(t) based on the flow signal f(t) and the measurement noise signal n(t).

Figure 7B:
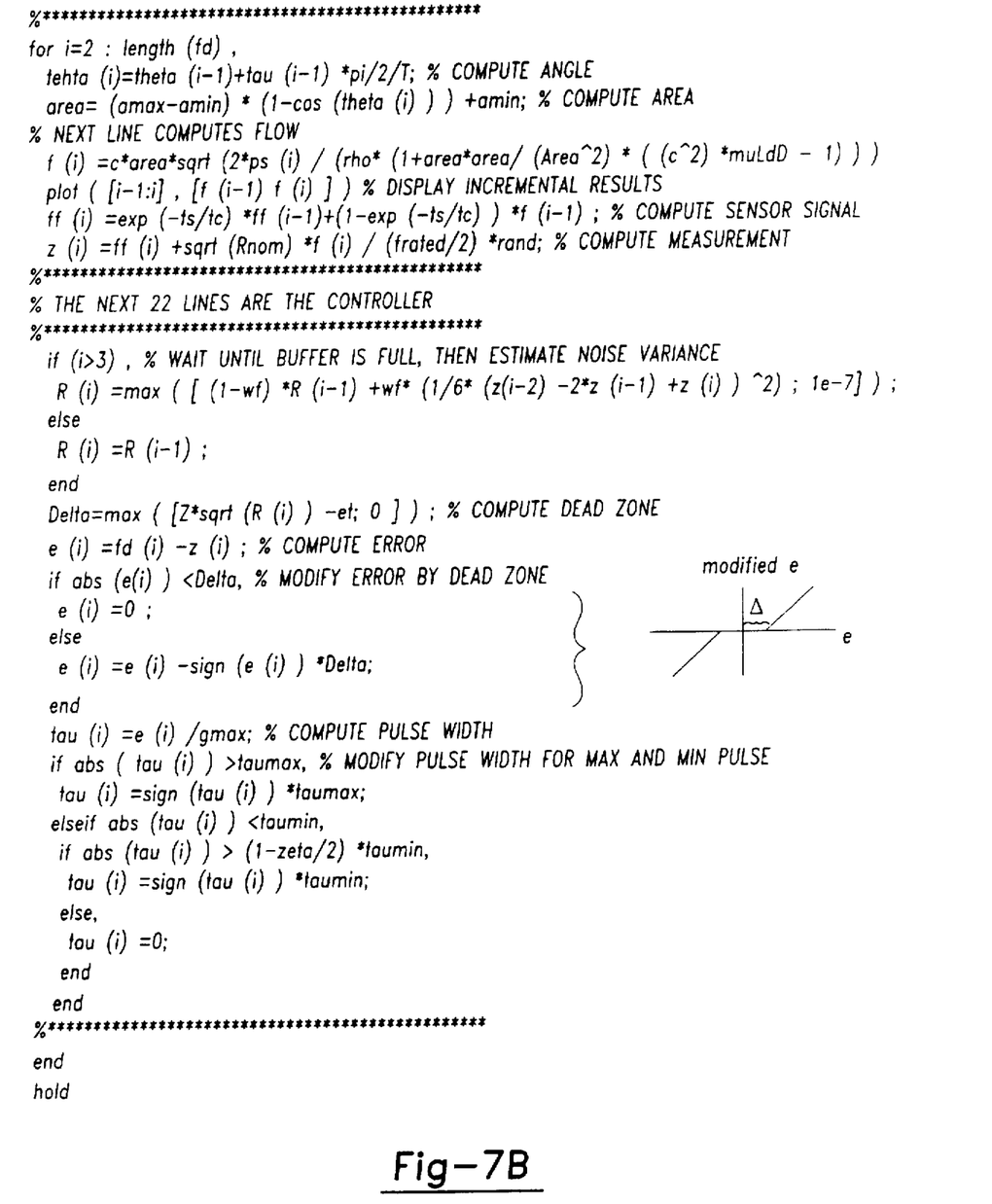

Preferably, controller 20 is configured by controller executed software. Exemplary controller executed software is provided in FIGS. 7A–B and configures controller 20 for the operations discussed with reference to FIGS. 4–7. The software shows basic data collection operations and signal calculations for controller 20. Alternatively, a hardware control circuit, or other software may be utilized to calculate the deadzone of nonlinearity, the flow setpoint signal $f_{sp}(k)$ and the actuator output signal u(t) for actuator 72 and controller 20.

It is understood, that while the detailed drawings and specific examples given describe a preferred exemplary embodiment of the present invention, they are for the purpose of illustration only. The invention is not limited to the precise details and conditions disclosed. For example, although a particular application is discussed, other applications may utilize the flow controller of the present invention. Also, although particular facility management systems and components are suggested, the system may be configured for various other HVAC systems. The system may easily be configured to utilize metric units. Also, single lines in the various Figures may represent multiple conductors. Various changes may be made to the details disclosed without departing from the spirit of the invention which is defined by the following claims.

What is claimed is:

1. In an environment control system including an air unit for providing air flow to an environment, the air unit being operatively associated with a controller and controlling an amount of the air flow in accordance with a flow setpoint signal from the controller, the controller comprising:

a flow sensor exposed to the air flow provided by the unit, the flow sensor generating a flow signal representative of an amount of the air flow provided to the environment;

a memory; and a processor coupled to the memory and the sensor, the processor configured to cyclically receive the flow signal and generate a controller output signal in response to the flow signal and the flow setpoint signal, the controller output signal being provided to the air unit to cause the air unit to provide the amount of the air flow represented by the flow setpoint signal, the processor calculating the controller output signal in accordance with a setpoint error signal and a deadzone of nonlinearity in order to reject noise, said setpoint error signal being the difference between the flow setpoint signal and the flow signal, wherein the processor calculates the deadzone of nonlinearity in accordance with a variance and standard deviation of the flow signal.

2. The controller of claim 1 wherein the setpoint error signal is related to the difference between a previous flow setpoint signal and the flow signal.

3. The controller of claim 1 wherein the memory includes a software-based control algorithm and the processor generates the flow setpoint signal in accordance with the software-based control algorithm.

4. The controller of claim 2 wherein the memory includes a software-based control algorithm and the processor cyclically generates the actuator output signal in accordance with cyclical operation of the software-based control algorithm, and wherein the previous flow setpoint signal is from a most recent previous cycle of operation of the control algorithm.

5. The controller of claim 1 wherein the memory includes a software-based control algorithm and the processor cyclically generates the actuator output signal in accordance with cyclical operation of the software-based control algorithm, and wherein the deadzone of nonlinearity is stored in the memory and recalculated each cycle of operation of the control algorithm.

6. The controller of claim 5 wherein the deadzone of nonlinearity is adaptively calculated.

7. The controller of claim 6 wherein the deadzone of nonlinearity is adaptively related to the variance.

8. A controller for use in an environment control system including an air duct including damper operatively associated with actuator, the actuator positioning the damper so that the damper provides a rate of air flow to an environment in response to an actuator control signal, the actuator being operatively coupled to the controller, the controller comprising;

a sensor means for generating an actual flow signal representative of the rate of the air flow provided across the damper;

a memory means for storing information; and a processor means coupled to the memory means and the sensor means, the processor means for cyclically receiving the actual flow signal from the sensor means and for cyclically generating the actuator control signal in response to the actual flow signal, wherein the actuator control signal is related to a desired rate for the rate of the air flow provided across the damper, the processor means calculating the actuator control signal is accordance with a setpoint error signal and a deadzone of nonlinearity in order to reject noise, said setpoint error signal being the difference between the flow setpoint signal and the flow signal, wherein the deadzone of nonlinearity is calculated in accordance with a variance and standard deviation of the actual flow signal.

9. The controller of claim 8 wherein the setpoint error signal is related to a difference between a flow setpoint signal generated in a previous cycle of operation of the processing means and the actual flow signal received in a current cycle of operation of the processing means.

10. The controller of claim 8 wherein the memory means stores a software-based control algorithm and the processor means generates the actuator output signal in accordance with the software-based control algorithm.

11. The controller of claim 9 wherein the memory means stores a software-based control algorithm and the processor cyclically generates the flow setpoint signal in accordance with cyclical operation of the software-based control algorithm, and wherein the previous cycle is from a most recent previous cycle of operation of the control algorithm.

12. The controller of claim 8 wherein the memory means includes a software-based control algorithm and the processor means cyclically generates the flow setpoint signal in accordance with cyclical operation of the software-based control algorithm, and wherein the deadzone of nonlinearity is stored in the memory means and recalculated each cycle of operation of the control algorithm.

13. The controller of claim 12 wherein the deadzone of nonlinearity is related to a previous deadzone of nonlinearity calculated in a previous cycle.

14. The controller of claim 13 wherein the deadzone of nonlinearity is adaptively related to the variance.

15. In a control system including a unit for providing a flow of a fluid, a controller for providing a controller output signal, and a flow sensor for providing an actual flow signal, said controller including a memory and a processor, the unit being operatively associated with the controller and controlling an amount of the flow in accordance with a controller output signal from the controller, the flow sensor being exposed to the flow provided by the unit, the flow sensor generating the actual flow signal representative of the amount of flow provided, a method of controlling the amount of the flow provided by the unit comprising steps of:

receiving the actual flow signal from the flow sensor;

determining a setpoint error signal based on the difference between a flow setpoint signal and the actual flow signal;

calculating a deadzone of nonlinearity in accordance with a variance and standard deviation of the flow signal;

applying the deadzone of nonlinearity to the setpoint error signal to develop the controller output signal; and providing the controller output signal to the unit.

16. The controller of claim 15 wherein the step of determining a setpoint error signal includes determining the setpoint error signal based on a difference between a previous flow setpoint signal and the actual flow signal.

17. The controller of claim 15 wherein the memory includes a software-based control algorithm and the processor generates the actuator output signal in accordance with the software-based control algorithm.

18. The controller of claim 16 wherein the memory includes a software-based control algorithm and the processor cyclically generates the actuator output signal in accordance with cyclical operation of the software-based control algorithm, and wherein the previous flow setpoint signal is from a most recent previous cycle of operation of the control algorithm.

19. The controller of claim 15 wherein the deadzone of nonlinearity is adaptively calculated, whereby the deadzone of nonlinearity is related to previous values of the deadzone of nonlinearity.

20. The controller of claim 16 wherein the deadzone of nonlinearity is adaptively related to the variance.

determining a setpoint error signal based on the difference between a flow setpoint signal and the actual flow signal;

calculating a deadzone of nonlinearity in accordance with a variance and standard deviation of the flow signal;

applying the deadzone of nonlinearity to the setpoint error signal to develop the controller output signal; and providing the controller output signal to the unit.

\* \* \* \* \*